United States Patent [19]

Thornhill et al.

[11] Patent Number: 5,209,354

[45] Date of Patent: May 11, 1993

[54] REUSABLE BLISTER PACKAGE

[75] Inventors: David R. Thornhill, Huevelton, N.Y.;
Carol J. Isaminger, Memphis, Tenn.;
John M. Pinkerton, Ogdensburg,
N.Y.; David R. Roberts,
Germantown, Tenn.; **James A.
Warick**, St. Paul, Minn.

[73] Assignee: Newell Operating Company,
Freeport, Ill.

[21] Appl. No.: 843,862

[22] Filed: Feb. 11, 1992

[51] Int. Cl.⁵ ............................................. B65D 73/00
[52] U.S. Cl. ...................... 206/469; 206/461;
206/470; 206/45.34
[58] Field of Search .................. 206/45.34, 461, 467,
206/469, 470; 229/221

[56] References Cited

U.S. PATENT DOCUMENTS

| D. 305,000 | 12/1989 | Hernandez . | |
|---|---|---|---|
| 2,993,590 | 7/1961 | Denton | 206/469 |
| 3,394,801 | 7/1968 | Hanson | 206/470 |
| 3,463,309 | 8/1969 | Szostek | 206/470 |
| 3,529,718 | 9/1970 | Zaremski | 206/469 |
| 3,650,386 | 3/1972 | Tigner | 206/469 |
| 4,016,972 | 4/1977 | Szamborski . | |
| 4,058,212 | 11/1977 | Wyslotsky . | |
| 4,319,684 | 3/1982 | Backman et al. | 206/470 |
| 4,408,693 | 10/1983 | Brewaeys et al. | 206/469 |
| 4,437,566 | 3/1984 | Szahler | 206/467 |
| 4,498,589 | 2/1985 | Scott et al. . | |
| 4,499,353 | 2/1985 | Shields . | |
| 4,569,442 | 2/1986 | Bushey . | |
| 4,574,951 | 3/1986 | Weaver | 206/469 |
| 4,687,129 | 8/1987 | Cugley . | |
| 4,724,964 | 2/1988 | Hernandez . | |
| 4,803,048 | 2/1989 | Nason | 206/469 |

FOREIGN PATENT DOCUMENTS

| 2617137 | 12/1988 | France | 206/461 |
|---|---|---|---|
| 1580791 | 12/1980 | United Kingdom | 206/469 |

OTHER PUBLICATIONS

Alloyd Co., Inc., "Clamshell", *Packaging*, vol. 31, No. 9, Aug. 1986, p. 53.

*Primary Examiner*—David T. Fidei
*Attorney, Agent, or Firm*—James G. Staples

[57] ABSTRACT

An improved reusable blister package is provided which consists of a base member, a top member and a label sheet. The top member mateably engages the opening of the base member. The label sheet seals the package shut after manufacture and prior to purchase. The package is opened by pulling the label sheet and the top member out and away from the base member thereby tearing the label sheet along the upper and side portions of the top member. The label sheet located along the lower end of the top member remains untorn and provides a hinge mechanism connecting the lower end of the top member to the lower end of peripheral flange of the base member. The improved package provides an outwardly facing label sheet that is entirely available for graphic presentations of logos and other product indicia.

10 Claims, 1 Drawing Sheet

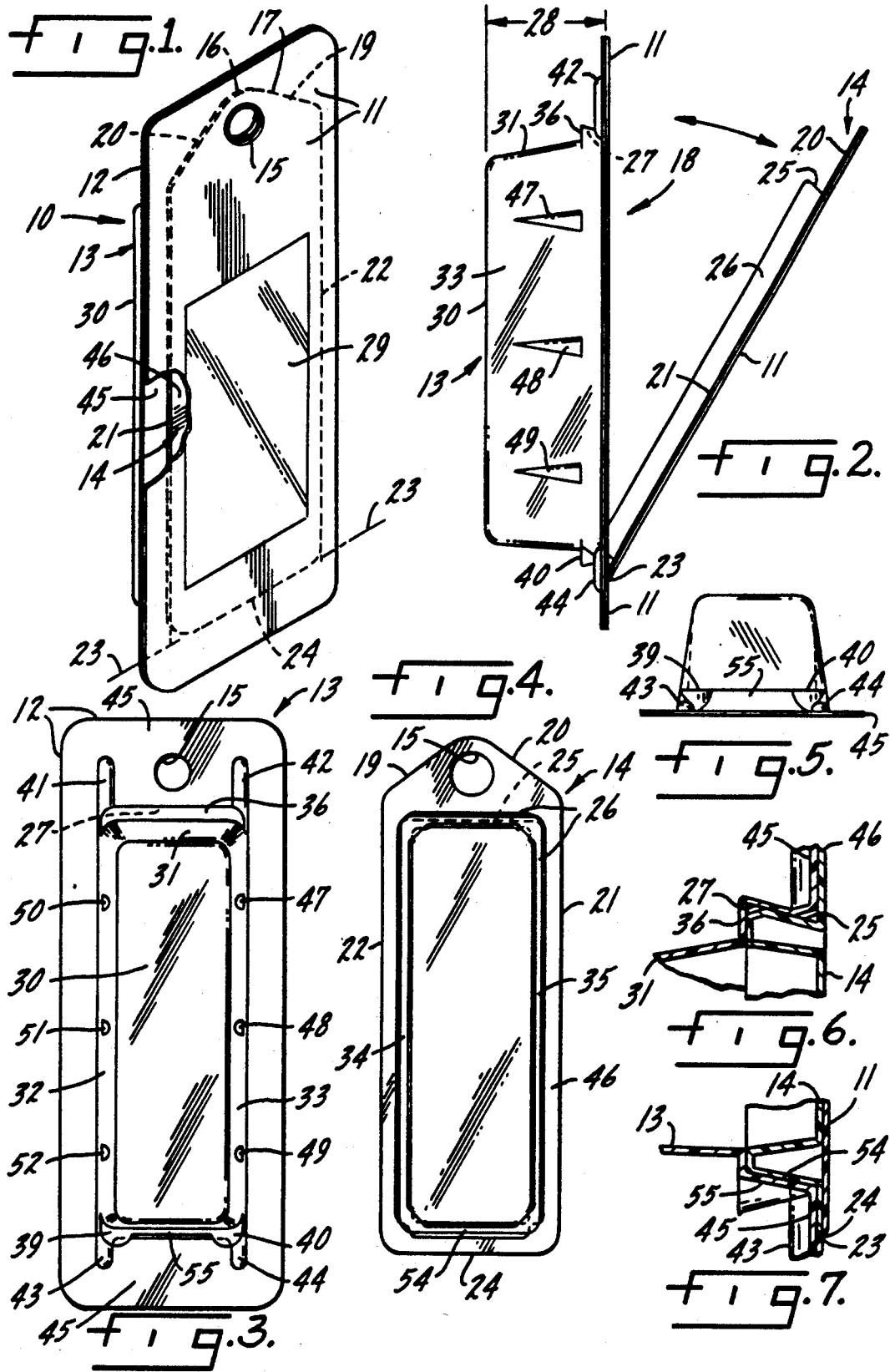

REUSABLE BLISTER PACKAGE

This invention relates generally to blister packages for the retail display of small items, and more particularly, to such blister packages which are reclosable and therefore reusable by the consumer.

BACKGROUND OF THE INVENTION

Retailers and manufacturers of small items, such as small hardware items, are constantly presented with the problem of properly displaying their goods on the shelf to the consumer. Because items such as picture hangers, screws and tacks are no longer sold in bulk or by weight, such items must be packaged in manageable quantities for sale to the consumer. Such packages are normally of a rectangular shape with a hole through the top and are displayed on a wire-type carrier, or display hook, that extends horizontally outward from a rear shelf wall.

Conventionally, the goods are contained within a clear plastic portion, known as the blister. The blister is mounted on a flat piece of cardboard or is bordered by a wide peripheral flange. Because the blister portion cannot be used for the display of trademarks and product information, the cardboard or flange bordering the blister must be large enough to display this information. Thus, much of the shelf space consumed by a blister package is attributable to the display of trademarks and other product information, not containing the products themselves. This is an inefficient use of shelf-space; retailers sell products, not packages and packaging information.

Because packaging small items in these blister-type packages is a relatively inefficient use of shelf space or area in today's highly competitive retail environment, retailers will crowd the horizontally extending display hooks together thereby creating a crowded shelf appearance and making it difficult for the consumer to discern one product from another. A manufacturer's products can be lost in the "sea" of competing products hanging on the numerous display hooks.

Thus, two competing concerns are present. Retailers are concerned with making the best use of their available shelf space and floor space; manufacturers are concerned with product appearance and product identity. Both retailers and manufacturers desire the entire shelf areas containing blister-type packages to have an attractive appearance. The present invention makes significant contributions to all of the above concerns. To appreciate the contributions made by the present invention to the blister package art, an understanding of the available blister packages and their shortcomings is necessary.

One conventional embodiment of a blister package includes a clear blister or product containing portion that is glued over a piece of cardboard. The product is contained within the space or chamber between the blister and the stiff cardboard backing. While these types of blister packages are the least expensive to manufacture, they are the most inefficient in terms of shelf space. Cardboard mounted blister packages take up too much shelf space because the blister portion containing the product is not available for labeling or product identification; it is too difficult and too expensive to put a label on the blister itself. Therefore, the stiff cardboard backing must extend significantly beyond the outer periphery of the blister portion to adequately identify the manufacturer, the product specifications and display any logos.

Other blister-type packages that are reclosable or reusable are also known. These types of blister packages are normally manufactured out of a single piece of clear plastic. The blister or product containing portion is integrally connected to the top or back member by a "living hinge" that joins the two parts. The package may be opened and closed repeatedly because at least one nesting surface on the product containing portion mates with a cooperating surface on the top portion allowing the package to close and open repeatedly. Because the top is not permanently sealed or glued to the product containing portion, the package may be reopened and reclosed. Thus, the consumer can use the package as a container for the small products at home without the need for transferring the products to a different container such as a cup or a jar. The reusable blister concept has been received very favorably and is used for a variety of products.

However, current reclosable blister packages do not satisfy the product presentation and shelf space concerns of manufacturers and retailers alike addressed above. Namely, the product is still contained in a clear blister bubble which dominates the appearance of the package. In order for a manufacturer to properly identify the product and display its logo, a large outer periphery must extend substantially beyond the blister portion. This large outer periphery wastes valuable shelf space. Thus, while the consumer has gained the benefits of a reusable package, the retailer's concern regarding wasted shelf space is largely unaddressed and the manufacturer still has little space on which to properly identify the product and display its logo.

Thus, there is a need for a new, improved reusable blister package that makes economical use of the retailer's limited shelf space and still provides the manufacturer adequate space to identify its product. This problem has been solved by the present invention.

BRIEF DESCRIPTION OF THE INVENTION

An improved reusable blister package that efficiently uses shelf space while enabling a manufacturer to prominently display its logo, graphics and other indicia is provided as follows. The container is manufactured from three separate parts: a base member, which includes the blister portion; a top member which serves as a lid; and a label sheet, or adhesive front sheet. This assemblage being described from rear to front as the consumer would view the container hanging on a support hook.

The base member includes a product containing portion which is commonly referred to as the blister. The opening of the product containing portion is shaped so that it can mateably engage with the top member. A peripheral flange extends outward from and around the opening and beyond the outer periphery of the top member when the package is closed. At least one nesting surface for engaging the top member is provided inside the product containing portion just inside of the opening.

The top member is of the same general geometrical shape as the base member, only the outer periphery of the top member is smaller than the outer boundaries of the peripheral flange of the base member. The top member is sized to mateably engage the base member when the two are folded together. The top member includes an outwardly extending wall which engages the nesting surface of the base member. The engagement of the wall and the nesting surface provide the mechanism which enables the container to be opened and reclosed repeatedly.

Finally, the label sheet covers the top member and the outer portion of the peripheral flange of the base member when the product is sealed by the manufacturer. Hence, the outer periphery of the top member must be inside of the outer periphery of the peripheral flange of the base member to ensure an adequate seal by the adhesive label sheet. The label sheet includes a line of perforations that are in matching registry with the upper end and opposing sides of the outer periphery of the top member. The label sheet is not perforated along the lower end of the top member.

In the preferred embodiment, a pull tab consisting of the upper perforation of the label sheet and the upper end of the top member is accessible to being gripped and pulled by the consumer. The container is opened by pulling the pull tab outward and downward. A hinge mechanism is provided at the lower ends of the top member and the base member by the unperforated portion of the label sheet which remains in contact with lower outer peripheral flange of the base member.

The package is displayed by the retailer with the label sheet facing outward toward the consumer and the product containing portion of the base member facing inward toward the back of the shelf. Thus, the largest flat surface area of the package, which is bounded by the outer periphery of the peripheral flange of the base member, is available to the manufacturer for graphics such as logos and product specifications. The "blister portion" or the product containing portion of the base member, which cannot effectively be used for labeling purposes, projects inward toward the rear of the shelf. Therefore, no portion of the flat surface area which can be effectively used to display graphics is wasted. The package makes as efficient use of shelf space as possible while enabling the manufacturer to have more surface area for graphics in a smaller package.

Thus, the present invention discloses a reusable blister package with an effective hinge provided by the lower end of the label sheet that is attractive to both retailers and manufacturers alike. The large, flat surface area facing the consumer enables the manufacture to display improved graphics and create a dramatic merchandizing effect. Because the label sheet, which faces outward toward the consumer, is a label, the graphics and/or color scheme may be easily changed by the manufacturer. Retailers can now demand color coordinated or color coded groups of products from a manufacturer.

The package is also attractive to consumers because it provides the benefits of prior reclosable blister packages. Namely, the consumer can still see the products before purchase and the package is a useful container for home use.

BRIEF DESCRIPTION OF THE DRAWINGS

This invention is illustrated more or less diagrammatically in the accompanying drawings wherein:

FIG. 1 is a front left perspective view of a reclosable blister package made in accordance with this invention;

FIG. 2 is a left side view of the reclosable blister package of FIG. 1 with the top member and label sheet disengaged from the base member;

FIG. 3 is a rear elevation view of the base member of the reclosable blister package of FIG. 1;

FIG. 4 is a rear elevation view of the top member of the reclosable blister package of FIG. 1;

FIG. 5 is a bottom view of the base member of the reclosable blister package of FIG. 1;

FIG. 6 is a partial and enlarged left side section view of the reclosable blister package shown in FIG. 1, the upper end of the top member being engaged with the upper end of the opening of the base member, the package being in the closed position; and FIG. 7 is a partial and enlarged left side section view of the reclosable blister package of FIG. 1, the lower end of the top member being engaged with the lower end of the base member, the package being in the closed position.

DETAILED DESCRIPTION OF THE INVENTION

Like reference numerals will be used to refer to like or similar parts from Figure to Figure in the following description of the drawing.

FIG. 1 is a perspective view of the reusable blister package 10 made in accordance with the present invention. The package consists essentially of three layers or plies of generally overlapping sheet material, two of which are formed into three dimensional structures.

The first layer or ply, as viewed in FIG. 2 and looking toward the left, is the flat label sheet 11 whose generally rectangular contour is best seen in FIG. 1 and whose thickness is best appreciated in FIG. 2. The label sheet 11 faces outward toward the consumer and serves as a flat surface for the display of graphics and other product information. The label sheet 11 covers the large surface area bordered by the outer periphery 12 of the base member 13 (see FIG. 3). The label sheet entirely covers the generally pentagonal contour of the top member 14 (see FIGS. 1 and 4) when the top member 14 is in the closed position or is mateably engaged with the base member 13 (see FIG. 3). As discussed in detail below, the label sheet 11 includes perforations 17 along the upper ends 19, 20 and two opposing sides 21, 22 of the top member 14 and remains unperforated along the lower end 24 of the top member 14. The lower, unperforated portion of the label sheet 11 provides a hinge mechanism 23 which pivotally joins the top member 14 to the base member 13.

The second of the three layers is the top member 14. The top member 14 is disposed between the flat label sheet 11 and the base member 13. The outer periphery of the top member 14 is of a general pentagonal shape (see FIGS. 1 and, especially, 4) but the protruding wall 26, which mateably engages the opening 18 (see FIG. 2) of the base member 13, has a generally rectangular contour. As best seen in FIG. 2, the top member 14, in conjunction with label sheet 11, serves as a pivoting lid to the base member 13. As discussed below, the top member 14 may be reopened and reclosed so the consumer can use the package 10 as a container at home without transferring the goods to a different container such as a cup or a jar.

The third of the three layers is the base member 14. As best seen in FIGS. 2 and 3 the base member includes the blister, or product containing portion 30. The see-through product containing portion 30 faces the away from the consumer when the package is hung from a display rack (not shown). In the preferred method of display, the label sheet 11, which includes logos and other graphic presentations, faces toward the consumer. While the clear product containing portion 30 faces inward away from the consumer, it still enables the consumer to view the products before purchase.

Referring to FIG. 1, the hole 15 which is formed in all three layers, provides a means for hanging the package 10 on a horizontally extending display rack or hook (not shown).

To open the package 10, the consumer grasps the pull-tab 16 provided near the uppermost point of the perforation 17 in label sheet 11. The portion of the label sheet 11 which is co-extensive with the outer boundaries of the top member 14, and the top member 14 itself, are both pulled outward and downward from the base member 13 thereby tearing the perforation 17 along a path overlying the upper ends 19, 20 and opposing sides 21, 22 of the top member 14. The label sheet 11 remains untorn along the hinge line indicated at 23 (see FIG. 1). This portion of the label sheet along the lower end 24 of the top member 14 provides a hinge mechanism 23 enabling the top member 14 to remain pivotally connected to the base member 13 after the initial opening along the perforation 17. If the manufacturer does not require a significant amount of space for graphics, a window 29 may be included in the label sheet 11 which would enable the consumer to view the products without removing the package 10 from the shelf.

FIG. 2 illustrates the hinge, indicated at 23. The top member 14 and the portion of the label sheet 11 adhering to the top member 14 are simultaneously pulled away from the base member 13. As discussed above, the label sheet 11 is torn along the upper ends 19, 20 and opposing sides 21, 22 of the top member 14 (19 and 22 are not shown in FIG. 2) but remains untorn along the lower end 24 of the top member 14 thereby providing the hinge 23. The top member 14 mateably engages the opening 18 (see FIG. 2) of the base member 13 upon reclosure when the top surface 25 of the protruding wall 26 engages the nesting surface 27 (see FIGS. 2 and 3) located just inside the product containing portion 30 of the base member 13.

The base member 13 and the top member 14 engage one another by a closure mechanism. The specific location of the closure mechanism is not important. The closure mechanism of the preferred embodiment, which is best seen in FIG. 2, is located at the nesting surface 27 of the upper end 31 of the product containing portion 30 of the base member 13, see FIG. 2. However, other closure mechanisms may be provided along the sides 32, 33 of the product containing portion 30 and the opposing side walls 34, 35 of the top member 14. Further, the depth, indicated at 28, of the product containing portion 30 of the base member 13 can be varied according to the quantity and size of the items to be contained therein.

FIG. 3 is a rear elevation view of the base member 13. The nesting surface 27 positively engages the top surface 25 of the protruding wall 26 of the top member 14 (see FIG. 4). The nesting surface 27 extends slightly upward and outward (see FIG. 6) from the body of base member 13 thereby creating a stacking surface 36. To provide level stacking for several base members 13 after manufacture, additional stacking surfaces 37, 40 are provided at the lower end of the base member 13. The alignment ribs 47–52 also make it easier to stack a series of base members 13 after manufacture. The upwardly extending ribs 41, 42 and downwardly extending ribs 43, 44 provide additional strength to the outwardly extending flange 45 of the base member 13.

FIG. 4 is a rear side view of the top member 14. The outwardly extending wall, shown generally at 26, mateably engages with the opening 18 (see FIG. 2) of the product containing portion 30 of the base member 13. The upper surface 25 of the outwardly extending wall 26 positively engages the nesting surface 27 (see FIGS. 2, 3 and 6) to snap the top member 14 shut when the reusable container 10 is closed. The perforation 17 of the label sheet 11 (see FIG. 1) is in matching registry with the upper ends 19, 20 and opposing sides 21, 22 of the outer periphery of the top member 14. The upper ends 19, 20 of the top member 14 form an upwardly extending flange which forms part of the pull-tab mechanism 16.

FIG. 5 is a bottom view of the base member 13 shown in FIG. 3. As shown above, the stacking surfaces 37, 40 provide a level stacking surface to complement the stacking surface 36 adjacent to the nesting surface 27 (see FIG. 6). The size of the peripheral flange 45 can be varied according to the amount of graphic space desired, but need extend only slightly beyond the outer periphery 46 of the top member 14.

FIG. 6 further illustrates the closure mechanism located at the upper ends 19, 20 of the top member 14 and the upper end 31 of the base member 13. The top outwardly protruding wall 25 positively engages the nesting surface 27. Because the material comprising the base member 13 and top member 14 is preferably a resilient material like polystyrene, the top wall 25 simply snaps into place as shown upon the application of manual pressure.

FIG. 7 illustrates the precise location of the hinge 23. The hinge 23 connects the lower end 24 of the top member 14 to the peripheral flange 45 of the base member 13. The bottom outwardly extending wall 54 of the top member 14 is free to pivot upward and outward out of the lower nesting surface 55 of the base member 13.

Thus, a reclosable blister package 10 is provided which includes a hinge 23 consisting of the untorn portion of the label sheet 11. The hinge 23 flexibly connects the lower end 24 of the top member 14 to the lower end (see FIG. 3) of the peripheral flange 45 of the base member 13. The result is a reclosable blister package 10 that provides ample room for enhanced graphics on the label sheet 11. The chamber formed between base member 13 and top member 14 in closed condition is no smaller than the chamber of conventional blister packages. The entire surface area of the label sheet 11 is available for the display of logos, product specifications and other advertising information. No flat surface space that faces the consumer as the packages hang on a display rack is wasted.

Retailers are extremely pleased because the packages use shelf space economically. Oversized cardboard backing or wide flanges are no longer necessary for blister-type packages. Manufacturers favor this invention because of the increased surface area provided on label sheet 11 that is now available for graphics. Given the increased area for graphics, manufacturers are able to create a more aesthetically pleasing package which, of course, is also attractive to consumers and retailers.

The preferred material of construction is polystyrene for all three components, the base member 13, the top member 14 and the label sheet 11. The label sheet 11 is thinner than both the top member 14 and the base member 13 thereby enabling it to be peeled back and torn along the perforation 17 easily. Because all three components may be made of the same material, recycling is simplified. No separation of certain components from others is required.

Although the preferred embodiment of the present invention has been illustrated and described, it will at once be apparent to those skilled in the art that variations may be made within the spirit and scope of the invention. Accordingly, it is intended that the scope of the invention be limited solely by the scope of the hereafter appended claims and not by the specific wording in the foregoing description.

We claim:

1. A resealable dispensing container comprising:
   a base member;
   a top member;
   a label sheet;
   the base member having a product containing portion formed therein, the product containing portion including an opening for engaging the top member, the opening being bordered by an upper end portion, a lower end portion, and two opposing side portions,
   a peripheral flange extending outward from the upper end portion, lower end portion and opposing side portions of the opening, the peripheral flange further extending beyond the top member when the base member and top member are engaged with one another, the peripheral flange including a front side,
   the product containing portion of the base member also including at least one nesting surface disposed inside the product containing portion;
   the top member being bordered by an upper end, a lower end, and two opposing sides,
   the upper end, lower end and two opposing sides of the top member forming a wall, the wall mateably engaging the opening and engaging the nesting surface of the product containing portion when the top member and base member are engaged with one another, the top member also having a front side; and
   the label sheet having an upper end, a lower end and two opposing sides, the label sheet carried by the front side of the top member and the front side of the peripheral flange of the base member that extends beyond the top member,
   the label sheet including a separating means, the separating means being in matching registry with the upper end of the top member and the opposing sides of the top member, the label sheet being constructed and arranged to separate along the upper end and the opposing sides of the top member and remaining unseparated along the lower end of the top member and the lower end portion of the base member when the upper ends and opposing sides of the top member and label sheet are pulled away from the base member, the unseparated portion of the label sheet providing a hinge at the front side of the lower end of the top member and the front side of the peripheral flange at the lower end portion of the base member.

2. The container of claim 1, wherein one nesting surface of the product containing portion is disposed inside the product containing portion and adjacent to the upper end portion of the opening of the base member.

3. The container of claim 1, wherein one nesting surface of the product containing portion is disposed inside the product containing portion and adjacent to the lower end portion of the opening of the base member.

4. The container of claim 1, wherein the upper end of the top member further includes an upwardly extending flange, the upwardly extending flange including a tab means whereby the upwardly extending flange of the top member and upper end of the label sheet are easily grasped and simultaneously pulled away from the upper end portion of the base member.

5. The container of claim 1, wherein the top member consists essentially of polystyrene.

6. The container of claim 1, wherein the base member consists essentially of polystyrene.

7. The container of claim 1, wherein the label sheet consists essentially of polystyrene.

8. The container of claim 1, wherein the separating means of the label sheet is a line of perforations in matching registry with the upper end and opposing sides of the top member.

9. The container of claim 1, wherein the label sheet is constructed and arranged to tear along the upper end and opposing sides of the top member and remain untorn along the lower end of the top member.

10. A resealable dispensing package comprising:
    a base member having a cavity portion;
    a top member;
    a label sheet;
    the base member and the top member forming therebetween a chamber for receiving a product;
    the cavity portion of the base member defining an opening for engaging the top member, the opening being bordered by an upper end portion, a lower end portion, and two opposing side portions;
    a peripheral flange extending outward from the upper end portion, lower end portion and opposing side portions of the opening in the base member, the peripheral flange including a front side;
    the top member being bordered by an upper end, a lower end, and two opposing sides;
    the upper end, lower end and two opposing sides of the top member having a wall means for engaging the cavity in the base member, the top member also having a front side;
    the opposing sides of the top member terminating inwardly of the outer edges of said peripheral flange;
    the label sheet having an upper end, a lower end and two opposing sides, the label sheet adhering to the front side of the top member and that portion of the front side of the peripheral flange of the base member which is not overlaid by the top member; and
    the label sheet including a separating means, the separating means being co-extensive with the upper end of the top member and the opposing sides of the top member, the label sheet being constructed and arranged to separate along the upper end and the opposing sides of the top member but remaining unseparated along the lower end of the top member and the lower end portion of the base member when the upper ends and opposing sides of the top member and label sheet are pulled away from the base member,
    the unseparated portion of the label sheet providing a hinge at the front side of the lower end of the top member and the front side of the peripheral flange at the lower end portion of the base member.

* * * * *